United States Patent [19]

Chronberg

[11] 4,238,313
[45] Dec. 9, 1980

[54] METHOD AND MACHINE FOR MANUFACTURING A PLATE-LIKE MATERIAL MADE FROM AGGLOMERATED PARTICLES AND IN PARTICULAR CERAMIC PRODUCTS OBTAINED THEREBY

[75] Inventor: Sten Chronberg, Arnieres-sur-Iton, France

[73] Assignee: Agence Nationale de Valorisation de la Recherche (ANVAR), France

[21] Appl. No.: 972,075

[22] Filed: Dec. 22, 1978

Related U.S. Application Data

[62] Division of Ser. No. 811,078, Jun. 29, 1977, which is a division of Ser. No. 679,012; Apr. 21, 1976, Pat. No. 4,048,037.

[51] Int. Cl.³ .............................................. B01D 13/02
[52] U.S. Cl. ............................ 204/300 R; 204/180 R;
204/299 R; 106/39.5
[58] Field of Search ........... 204/180 R, 299 R, 300 R;
106/39.5, 313

[56] References Cited

U.S. PATENT DOCUMENTS

| | | | |
|---|---|---|---|
| 3,449,227 | 6/1969 | Heron et al. | 204/180 R |
| 3,449,230 | 6/1969 | Heron et al. | 204/180 R |
| 3,589,991 | 6/1971 | Hardy | 204/180 R |
| 3,753,885 | 8/1973 | Hammond, Jr. | 204/300 X |
| 3,943,049 | 3/1976 | Zucrer | 204/300 R |
| 3,977,937 | 8/1976 | Candor . | |

*Primary Examiner*—Arthur C. Prescott

[57] ABSTRACT

A method of making plate material consisting of agglomerated clay-based particles, comprising providing a liquid particle suspension such as slip within a gap left between two continuously travelling confronting electrodes at a given voltage applied thereto, subjecting the suspension to an electrophoretic action between said electrodes and an adjacent counter-electrode subjected to a different voltage and controlling the formation and thickness of the electrophoretic deposits on said first electrodes so that when they leave the electrophoretic field they will be fused together with their outer surfaces having contacted each other and recovering said plate formed continuously from both layers of electrophoretic deposits.

3 Claims, 5 Drawing Figures

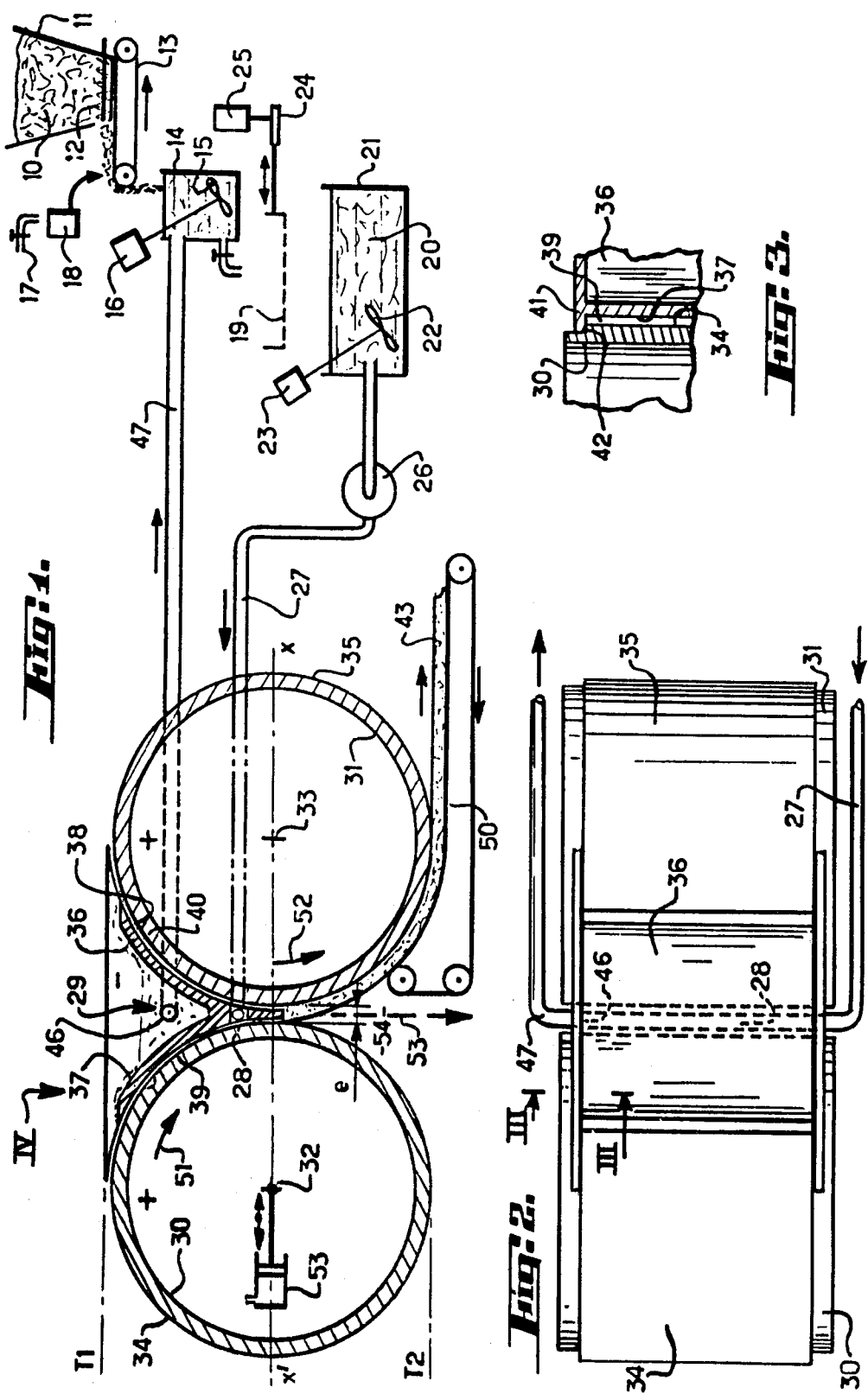

METHOD AND MACHINE FOR MANUFACTURING A PLATE-LIKE MATERIAL MADE FROM AGGLOMERATED PARTICLES, AND IN PARTICULAR CERAMIC PRODUCTS OBTAINED THEREBY

This is a divisional application of Ser. No. 811,078 filed June 29, 1977 which itself is a divisional of Ser. No. 679,012, filed Apr. 21, 1976 now U.S. Pat. No. 4,048,037, issued Sept. 13, 1977.

The invention relates generally to a method of making a plate-like or sheet-like material consisting of particles agglomerated, bound or bonded to each other or otherwise clustered together such as solid or plastic particles from a suspension within a liquid, the plate or sheet exhibiting after preparation thereof a cohesiveness adequate to enable it to be worked or put into practical use subsequently according to any known engineering art or process. Many technical processes are known wherein generally continuous plates are thus made from solid or plastic particles initially suspended within a liquid. Such is in particular the case of technical processes of manufacturing ceramics from a clay suspension in water which suspension is referred to as "slip" in the art. Such is also the case of the manufacture of papers, cardboards, fibre boards or like panels made from agglomerated fibres and so on.

According to any of these technical processes it is necessary after the suitable suspension having been prepared to separate the solid or plastic particles to be agglomerated from the solution medium. For this purpose various methods may be used and in particular filtering, press-filtering, electrophoretic methods.

The methods most commonly used make use of filter presses which however suffer from the inconvenience of requiring large investments as well as substantial labour or manpower.

The electrophoretic method which consists in forming onto an electrode an agglomerated deposit or crust of particles separated from their suspension medium is presently used only for the shaping of complex parts or components. It is thus possible to make through anaphoresis, i.e. through an anodic deposit obtained through electrophoresis ceramic parts of a more or less complex shape from a slip suspension onto a metal for instance zinc anode of corresponding suitable shape. Once the deposit has been carried out it is separated or removed from the anode which may be re-used for the shaping of another similar part or element.

The method according to the invention enabling the preparation of a plate-like material consisting of particles clustered together that is agglomerated, bound or bonded to each other such as solid or plastic particles in particular clay-based particles from a suspension in a liquid such in particular as water, said plate exhibiting a sufficient cohesiveness to enable it to be worked or put into practical use subsequently according to any known engineering processes with the view in particular to manufacturing ceramic parts, is characterized according to the invention in that it comprises: bringing the suspension such in particular as slip into a gap left between two electrodes subjected to a given electric voltage and located in front of or opposite to each other which travel continuously, subjecting the suspension to an electrophoretic action between said electrodes and an adjacent counter-electrode subjected to a different electric voltage and controlling, i.e. adjusting the formation and in particular the thickness of the electrophoretic deposits built up on said first-named electrodes so that when they leave the electrophoretic field under the travelling action of said electrodes they will become fused or welded to each other with their outer surfaces which have contacted each other, and recovering said plate continuously formed from both layers of electrophoretic deposit. Advantageously as most of the suspension solutions are likely to be treated or processed through anaphoresis, the travelling electrodes are anodes whereas the counter-electrode is the cathode and is stationary.

It will be appreciated that by operating in that way the continuous formation of a plate-like material is achieved which is made from agglomerated or bound particles which have been automatically separated through an electrophoretic process or phenomenom from their suspension medium and this in a very simple manner without large investments or large labour requirement the method being likely to be very easily made automatic. It is moreover well known that electrophoresis is a very economical operating step in terms of electrical power consumption or expenditure on account of the sizes of the suspended ionized particles which are moved by the electrophoretic field.

The invention relates also to a machine or like apparatus or device enabling to carry out said method and characterized in that it comprises a pair of cylinders with circular cross-sections which are revolving very close to each other at substantially equal tangential speeds and the outer surfaces of which consist of a material likely to form an electrode plate for purposes of electrophoresis as known per se, for instance of zinc type; a counter-electrode provided in front of that is opposite to said surfaces of said cylinders within one of the two prismatic spaces of curvilinear triangular cross-section defined between said cylinders and their outer common tangential planes extending in parallel relation to the axial plane passing through the centre lines of the cylinders; input means for providing a suspension such as slip into said first space adjacent to said axial plane; an enclosed space containing said suspension in substantially fluid-tight and sealing relationship within said first space; overflow means enabling to remove the suspension having been conveyed through said space; means for recycling or reprocessing and regenerating the suspension adapted to receive the solution from said overflow means and feeding said input means; and means for receiving the plate formed through electrophoresis by two layers of agglomerated material deposited onto the surfaces of said cylinders and fused to each other substantially at said axial plane and leaving said first prismatic space while entering the second one under the effect of the continuous rotating motions of the cylinders. Usually both outside surfaces of the cylinders will constitute two anodes arranged in confronting relationship whereas said counter-electrode forms a prismatic cathode with a curvilinear V-shaped cross-section conforming substantially to the surface of each one of said cylinders over a little less than one quarter of their circumferences while leaving between the electrodes and counter-electrode the desired gap required for the formation of the electrophoretic deposits.

In this way is achieved in a simple manner the continuous travelling of the anodes enabling the formation of a continuous web or strip of a plate-like or sheet-like material the thickness of which may be controlled selectively or adjusted at will as well as the structure by changing the operating parameters of the electrophoretic process such in particular as the travelling speeds of the anodes, the electric current density, the voltage applied across the electrodes and so on. On the other hand, owing to the relatively large diameters for instance of about 1.50 m of the cylinders with respect to the thicknesses of the electrophoretic deposits or crusts for instance of about a few millimeters the stresses due to the initial curvatures of the electrophoretic deposits which are subsequently straightened out along a plane are not very high within the intermediate plate formed and especially they would balance each other within the plate consisting of both electrophoretic layers welded to each other having reversely directed radii of curvature, respectively. In that way no appreciable distortion and deformation due to internal stresses of the plates are to be feared during subsequent working processes and in particular during the baking or firing of keramics made from plates of agglomerated clays obtained according to the invention.

The invention is moreover directed to the plate-like articles, products, goods or like wares made from agglomerated, bound or bonded particles and manufactured according to the invention as well as to the finished in particular ceramic products made from intermediate agglomerated plate-like products according to the invention.

The invention will be better understood and further objects, characterizing features, details and advantages thereof will appear more clearly as the following explanatory description proceeds with reference to the accompanying diagrammatic drawings given by way of non limiting examples only illustrating presently preferred specific forms of embodiment of the invention and wherein:

FIG. 1 is a diagrammatic view partially in vertical cross-section showing a machine designed according to the invention;

FIG. 2 is a top view of a part of the machine shown in FIG. 1;

FIG. 3 is a detail view drawn on a larger scale with parts broken away and in cross-section taken upon the plane III—III in FIG. 2;

Figure 4:
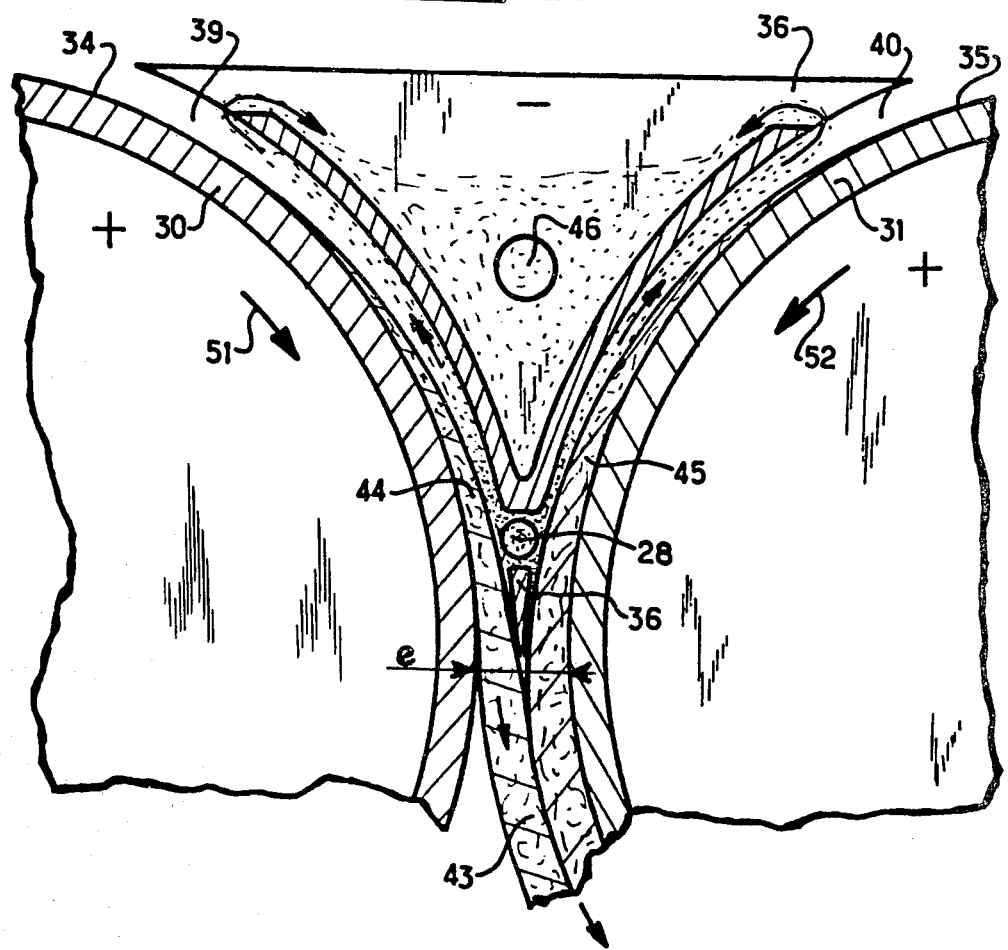
FIG. 4 illustrates on a larger scale the portion shown by the arrow IV in FIG. 1.

FIG. 1 should at first be referred to in which has been illustrated the application of the invention to the manufacture on a continuous production-line basis of a plate of agglomerated particles made from clays with the view to manufacturing ceramic parts or pieces.

The clays 10 contained within a hopper 11 are supplied through a feed regulator or like metering device 12 and a conveyor 13 into a first container 14 where they are mixed with water by means of a stirrer diagrammatically shown at 15, 16. At 17 has been shown a make-up water supply input and at 18 an electrolyte supply input which are added with a view to form the desirable slip suspension. After having passed on a vibrating sieve 19 the suitably metered slip 20 is held within a tank 21 where it is kept suspended by means of a stirrer 22, 23. The vibrating sieve 19 driven for instance through an eccentric 24 and a motor 25 enables to pick out, take off or remove the pebbles and other impurities.

The slip solution thus prepared is pumped through a pump 26 into a pipe-line 27 carrying the slip to a pipe 28 formed with suitable thoroughfare holes opening into a prismatic space 29 of curvilinear triangular cross-section defined between or by the nip of two cylinders or like rolls 30, 31 located near each other and the centre-line axes 32, 33 of which extend in parallel relation, and their tangential plane T. The outer surfaces 34, 35 of the cylinders or rolls 30, 31 which are seen in FIG. 2 are made from a suitable electrode material such as for instance a zinc foil or sheet. Over both of these cylinders is provided a prismatic counter-electrode 36 of curvilinear V-shaped cross-section conforming substantially to the surface of each one of the cylinders over a little less than one quarter of their circumferences and leaving between its counter-electrode faces 37, 38 located in front of or opposite to the electrode faces 34, 35, respectively, of the cylinders 30, 31, gaps 39, 40, respectively. Owing to the provision of sealing means such as shown in FIG. 3 where is seen a cheek or flange 41 of the counter-electrode 36 in engagement with a shoulder 42 of the electrode 30, the gaps 39, 40 are closed or sealed off in substantially fluid-tight relationship on the sides of the cylinders, respectively, forming an enclosed space which may accommodate the slip fed by the duct 28 into the gaps 39, 40 where the electrophoretic reaction will take place.

As shown in FIG. 4 once the machine has been put into operation and the process has been started as will be stated hereinafter when describing the operation of the machine the continuous plate of agglomerated material issuing from the machine is formed by welding or fusing together both layers of electrophoretic deposit or crust 44, 45 deposited onto the surfaces 34, 35 of the cylinders 31 and 32 sealing off in substantially fluid-tight relationship said enclosed space which holds the slip fed in at 28.

The slip solution pumped through the pump 26 thus will move upwards or rise in the gaps 39, 40 as shown by the arrows while running over the top portion of the counter-electrode 36 which is hollow inside, the overflow escaping or being drained away through a hole 46 towards a return duct 47 for flowing back to the tank 14 (FIG. 1).

In FIG. 1 has also been diagrammatically shown a belt conveyor 50 picking up and recovering the plate-like material 43 issuing from the machine and carrying it horizontally underneath the machine.

The arrows 51 and 52 show the directions of rotations of the cylinders 30, 31, respectively. The signs plus indicated within the cylinders show that in the exemplary embodiment contemplated the surfaces 34, 35 are anodes whereas the sign minus marked on the counter-electrode 36 show that the latter is a cathode, the deposit or coating being effected through anaphoresis upon both cylindrical anodes.

At 53 has been diagrammatically shown a power ram-like actuator forming a damper enabling to take up or compensate for the spacing between the centre-line axes 32, 33 in accordance with the thickness of the plate 43 formed. The machine frame has not been shown.

The machine which has just been described operates as follows.

Across the cylindrical anodes 34, 35 and the cathode 36 there is applied a potential difference for instance of about 10 to 30 volts which is quite adequate usually to achieve the building up of the desired deposits or coatings through anaphoresis. The slip is then fed into the spaces of the gaps 39, 40 by starting the pump 26 and sealing off from the beginning in substantially fluid-tight relationship the nip or gap e separating the cylinders 30, 31 from each other substantially in their axial plane x'-x for instance by means of a rubber sealing packing or gasket. The electrophoretic reaction then begins to occur with deposits or coatings of clays being built up onto the surfaces 34, 35 of the cylinders. The latter are then put into motion so that they revolve in the directions of rotation shown by the arrows 51 and 52, respectively. The speed of rotation of the cylinders depends upon the characteristics of the suspension fed into the gaps 39, 40, the thickness e of the plate to be formed which determines the magnitude of the spacing between the centre-line axes 32 and 33, the electrophoretic current density used, the final characteristics of specific gravity or density which are desired to be achieved for the plate, etc. In the case of a slip for manufacturing keramic tiles or other keramic products, for a plate being 6 to 7 mm thick current densities of about 1 to 10 milliamperes per square centimeter and speeds of rotation of the cylinders of about one revolution every two to five minutes may be used. With higher voltages and current magnitudes larger rotational velocities may of course be used.

The electrophoretic deposits or coatings would assume the appearance diagrammatically shown in FIG. 4, i.e. there are provided on the surfaces 34, 35 of the cylinders 30, 31, respectively, deposits 44, 45 with thicknesses increasing downwards from top to bottom which will be fused or welded together at the lower portion substantially on a level with the nip or gap e to form the plate 43.

The slip fed at 28 into the spaces 39, 40 and undergoing the electrophoretic action will rise or move upwards to run over as an overflow as shown by the arrows and be recycled through the return pipe-line 47 when flowing through the opening 46. During such a transit it will gradually become poorer in or loose clays as diagrammatically shown in FIG. 4 by the dots of density decreasing upwards from bottom to top.

In the examplary embodiment contemplated the plate 43 is curved against the cylinder 31 with a view to move out horizontally while being taken or picked up or recovered on the belt 50 of a belt conveyor below the machine. The plate may also issue vertically as diagrammatically shown at 53.

A particularly significant characterizing feature of the method besides that is in addition to or apart from the savings achieved when working same and continuously operating the machine which enables to obtain a full and easy automation of the invention (after the start and pushing away by the plate 43 of the sealing joint or gasket positioned initially at the start of the machine) is that the internal stresses within the plate 43 are perfectly balanced between both layers or coatings 44, 45 which have been fused or welded together so that the plate 43 may subsequently undergo any treatment without being likely to be affected by deformations or warpings due to internal stresses. This will result in an improved quality of the finished products made from such a plate less subject to becoming deformed during the various subsequent treatments that it will undergo than the other plate-like blanks obtained through other known processes.

Many modifications may be made to the machine and to the method of using same which have been disclosed. Thus for instance the feeding of slip could be effected into the lower curvilinear prismatic space 54 defined between the cylinders 30, 31 and their tangential plane $T_2$ the plate built up moving out from the top and the cylinders revolving in reverse directions, respectively.

In the machine illustrated a pair of cylinders having the same diameter and revolving at the same speeds are used for receiving the anodic deposits. Cylinders of different diameters may possibly be used provided that the speeds of rotation be adjusted so that the tangential velocities of both cylinders be substantially the same. There is then possible to obtain a composite plate with a certain residual stress present which is oriented in a certain direction if this is useful for instance for making ring-shaped products.

Figure 5:
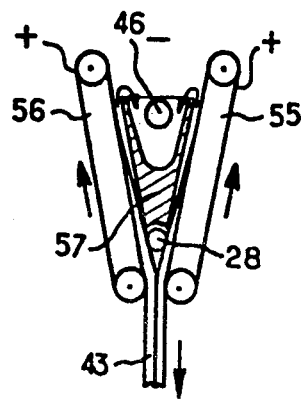
FIG. 5 diagrammatically illustrates an alternative embodiment or modification of a method likely to be used according to the invention.

In the alternative form of embodiment diagrammatically shown in FIG. 5 there has been used as an anodic surface instead of the outer surfaces of cylinders with circular cross-sections, both converging surfaces of two endless belts 55, 56 which are travelling while converging or tapering towards each other and moving past or in front of a V-shaped counter-electrode 57, whereas the remaining part of the operation of the machine may be the same as that disclosed hereinabove. In that instance the surfaces of the belts 55, 56 should of course be shaped so as to conform their electrode functions for receiving or accommodating the electrophoretic deposits or coatings in order to be also able to constitute a belt conveyor.

Therefore the invention is not at all limited to the forms of embodiment illustrated and described which have been given by way of example only, but it also comprises all the technical equivalents of the means disclosed as well as their combinations if same are carried out according to its gist and within the scope of the appended claims.

What is claimed is:

1. A plate-like product comprising a pair of sheet-like layers, each of which is formed of agglomerated particles from a slip solution comprising a suspension of said particles deposited on two different electrodes through electrophoresis, each layer having a side in contact with the respective electrode and the free outer side, each of said layers being fused to each other in an air-tight relation in the presence of said slip solution by connection of the free outer sides, whereby the bending stresses in the composite plate-like product are balanced.

2. A finished product such as tiles and similar ceramic articles manufactured through the heat treatment of the plate-like product according to claim 1, wherein the improvement consists in that said finished product is free from any appreciable distortion and resulting stress with respect to its general plane.

3. The plate-like product according to claim 1, wherein said layers are made from the same slip solution.

* * * * *

UNITED STATES PATENT AND TRADEMARK OFFICE
CERTIFICATE OF CORRECTION

PATENT NO. : 4,238,313
DATED : Dec. 9, 1980
INVENTOR(S) : Sten Chronberg

It is certified that error appears in the above-identified patent and that said Letters Patent are hereby corrected as shown below:

On the cover sheet should be inserted --

[30] FOREIGN APPLICATION PRIORITY DATA

April 25, 1975 [FR]   France   75 13091         --

Signed and Sealed this

Twenty-fourth Day of August 1982

|SEAL|

Attest:

GERALD J. MOSSINGHOFF

*Attesting Officer*   *Commissioner of Patents and Trademarks*